Patented Jan. 12, 1954

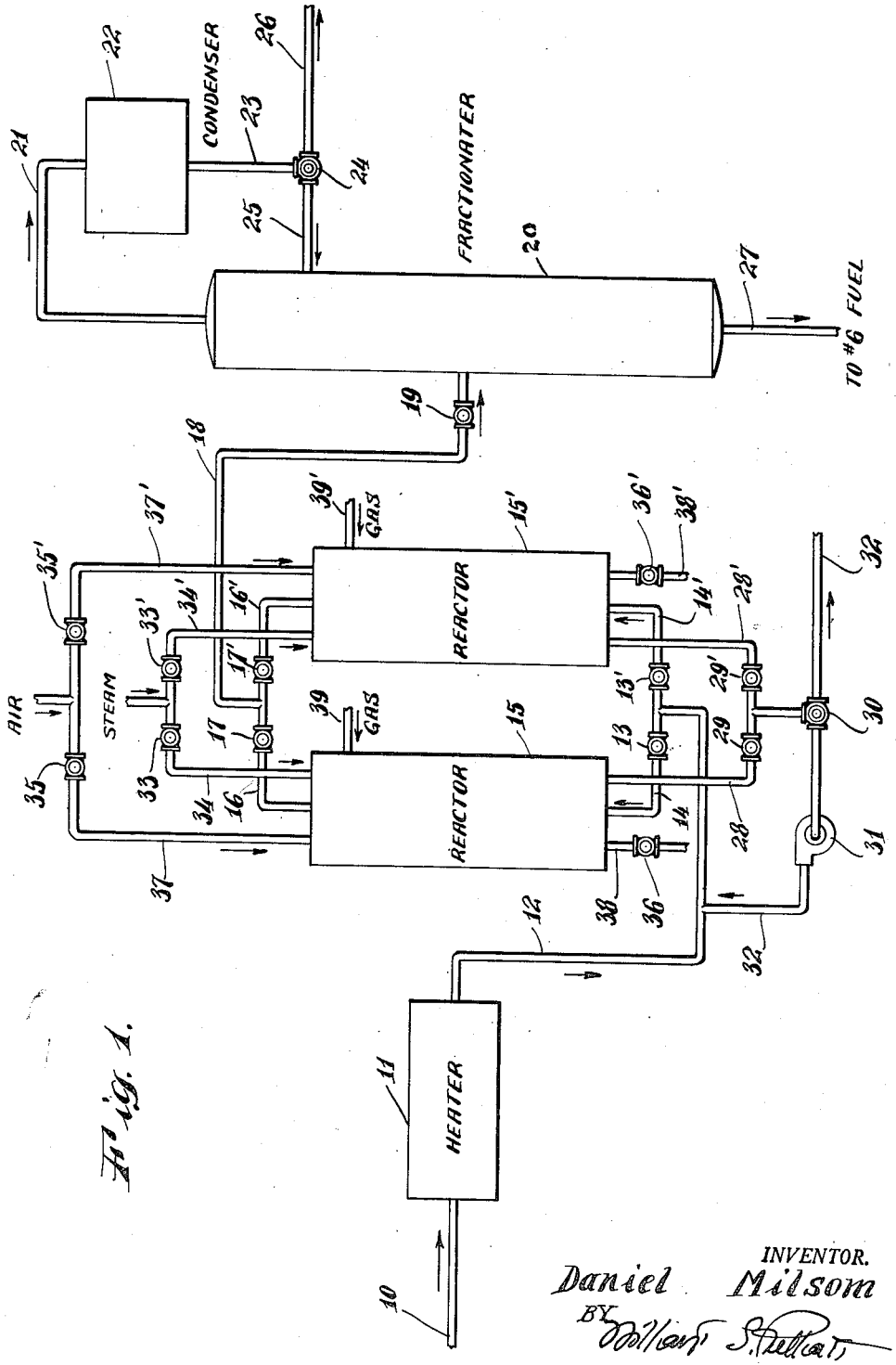

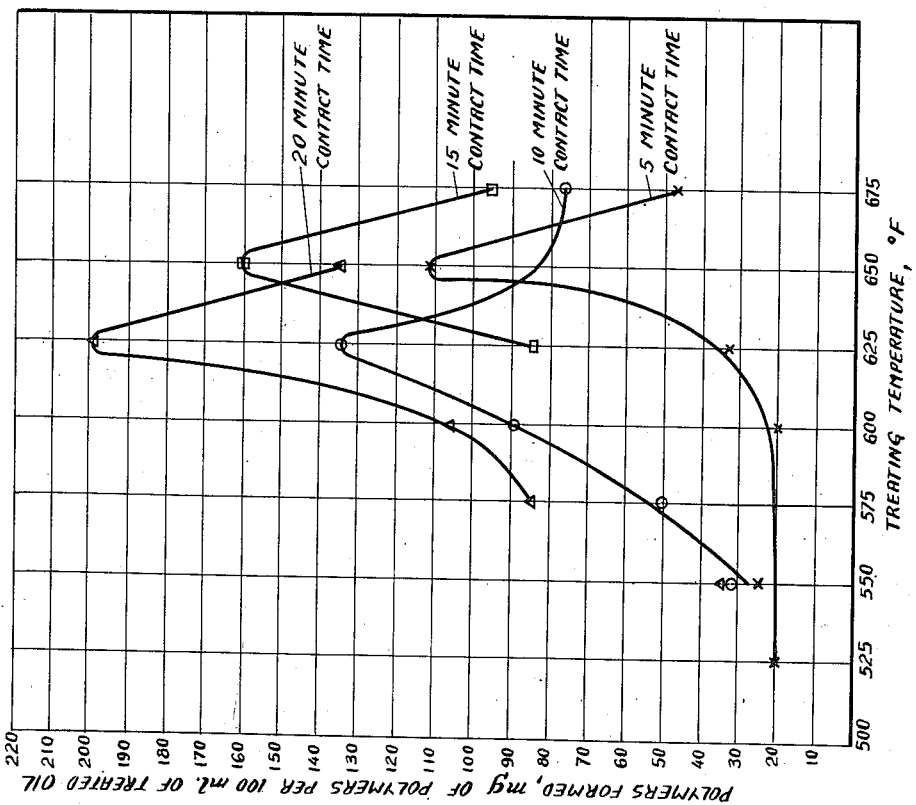

2,666,021

UNITED STATES PATENT OFFICE 2,666,021

STABILIZATION OF MINERAL OIL FRACTIONS

Daniel Milsom, Maplewood, La., assignor to Cities Service Research and Development Company, New York, N. Y., a corporation of New Jersey Application August 14, 1951, Serial No. 241,830

12 Claims. (Cl. 196—35)

This invention relates to the stabilization of mineral oils, and more particularly to the removal from mineral oils of gum-forming impurities of such a character as to render the oils unstable in storage.

Light mineral oils useful as blending stocks for gasoline, diesel oils, and distillate furnace oils, produced by the catalytic cracking of the heavier hydrocarbon fractions of crude oil tend to render the blended products very unstable in storage, especially if the oil is in contact with air, as is always the case when a fuel tank is maintained in partially filled condition. The problem is particularly acute in connection with distillate fuels, such as #2 fuel oil. This instability evidences itself in an increase in the soluble gum content of the oil, the formation of an insoluble gum precipitate, and a darkening of the color of the oil. The gums, both soluble and insoluble, tend to settle out and clog the screens, strainers, filters, or conduit lines of the equipment in which they are used, necessitating frequent shutdowns for cleaning or replacement of parts. The cause of the instability has not been definitely determined, but various investigators have attributed it to sulfur compounds, unstable nitrogen compounds, particularly the pyrroles, colloidal carbenes and carboids, or unstable diolefinic compounds. The instability may be due to any one or a combination of these constituents of the oil. Whatever the cause of the instability may be, however, it must be controlled or removed to produce a satisfactory, marketable product.

It has been proposed in the past to control the instability of light furnace oils by the addition of certain additives such as those disclosed in U. S. Patent 2,527,987, to Caron et al., in order to maintain in suspension the gums and sludges formed in the oil, so that filters and screens will not become plugged. While useful for this purpose, these additives will not prevent deterioration of the color of the oil, so that an off-colored product will result if the oil is kept in storage for any considerable period of time. This problem is not serious for furnace oils produced during the fall and winter months, and which move to the consumer without undue delay, but it becomes serious for oil produced during spring and summer months, which of necessity must be kept in storage until the next heating season. Oils which have deteriorated in color are difficult to sell, even though they are as satisfactory in use as a light-colored oil, and must be sold in some instances at a sacrifice in price.

I am also aware that it has been proposed to treat unstable oils with catalysts such as aluminum halides or boron fluoride at low or atmospheric temperatures in order to polymerize the olefins in the oil. Such processes, while they may remove a portion of the olefin content, and improve the stability of the oil to some degree, apparently do not remove the other gum and sludge forming constituents of the oil, and, so far as I know, have never gone into commercial practice.

It is an object of this invention to treat an unstable cracked oil in such manner as to render it stable in storage over long periods of time, with little gum or sludge deposition, and with no appreciable darkening of color. For the purposes of this application a stable oil is considered to be one in which the soluble gum content does not increase by more than 20 mg./100 cc., or the insoluble precipitate does not increase more than 2 mg./100 cc. in twelve months' storage.

It is a further object of this invention to produce a furnace oil of improved color and high stability from unstable catalytically cracked stocks.

I have discovered that the foregoing objects may be attained by treating, in the liquid phase, a catalytically cracked oil fraction with a catalyst comprising aluminum fluoride, at elevated temperatures and at pressures sufficient to prevent vaporization of the oil, for a period of about two minutes or longer. The optimum temperature of treating will vary according to the end boiling point of the oil treated, but it must be at about the end boiling point at atmospheric pressure, and is preferably within 50° F. of that temperature. The reason why the optimum temperature should vary with the end boiling point is not fully known, but it is suspected that the impurities associated with the higher boiling constituents of the oil are less reactive at lower temperatures than the lower-boiling impurities.

For commercial operations a two minute time of contact with the catalyst is sufficient, the product recovered having a light straw color acceptable in a first quality furnace oil, but if an even lighter colored oil is desired, the treating time should be increased. By increasing the contact time to from 10 to 20 minutes, a product is obtained which on fractionation will yield up to 85% recovery of a water white oil which shows no color degradation or increase in gum content when stored in an oven at 110° F. for twelve weeks.

In order that those skilled in that art may more fully appreciate the nature of my invention and the manner of carrying it out, it will be further described in connection with the attached drawings in which:

Fig. 1 is a diagrammatical flow sheet of my new process,

Fig. 2 is a set of curves showing the quantity of unstable impurities removed from oil A, as hereinafter defined, by treatment at various temperatures and with varying contact times, and Fig. 3 is a set of curves showing the quantity of unstable impurities removed from oil B, as hereinafter defined, by treatment at various temperatures and with varying contact times.

Referring now more particularly to Fig. 1, in a typical operation a furnace oil cut boiling, for example in the 340–630° F. range, is taken from storage under a pressure sufficient to maintain it in liquid phase during the catalyst contacting step, say from 250–300 p. s. i. g., through line 10, and is passed through a heater 11 in which its temperature is raised to about 625–650° F. The oil is passed through line 12, open valve 13, and line 14 to a reactor 15, flow of oil into a parallel reactor 15' being prevented by the closure of valve 13'. The reactors 15 and 15' are packed with a supported aluminum fluoride catalyst, the preparation of which will be hereinafter discussed.

The oil is passed upwardly through the reactor 14 at a rate such that the average residence time of the oil in the reactor is in the order of two or more minutes, and is withdrawn through line 16, valve 17, and line 18, which is equipped with a pressure reducing valve 19, to a fractionator 20, valve 17' being in closed position to prevent backflow of oil into the reactor 15'. From the fractionator 20 an overhead product consisting of oil vapors is withdrawn through line 21 and passed to a condenser 22, from which a liquid product is withdrawn through line 23. A proportioning valve 24 returns a portion of the product to the fractionator 20 as reflux through line 25, the balance, consisting of a highly stable oil, being drawn off to storage through line 26. The bottoms from fractionator 20, consisting largely of polymerized gum-forming impurities, may be withdrawn through line 27 for incorporation with #6 or Bunker C fuel, or for such other disposal as may be desired.

After a number of hours on stream, the catalyst in reactor 15 will become coated with a polymer deposit, reducing its activity to a point such that regeneration becomes necessary. This time will vary, depending upon the characteristics of the oil being treated, but is usually twenty four hours or longer. When it is desired to regenerate the catalyst, valves 13 and 17 are closed, and valves 13' and 17' are opened, allowing oil to flow through line 14', reactor 15', line 16', valve 17', and line 18 to the fractionator 20, under the same conditions as described above. The oil remaining in reactor 15 is withdrawn through line 28, valve 29 and three-way valve 30, and is forced by pump 31 through line 32 to line 12, where it mingles with the oil being passed to reactor 15'.

When reactor 15 has been emptied of oil, two-way valve 30 is turned to connect line 28 with line 32, and steam is admitted to the reactor 15 through valve 33 and line 34. Valve 33' in line 34' is, of course, closed in order to prevent entry of steam into reactor 15'. Steam is thereafter passed through the reactor 15 and out through lines 28 and 32 at temperatures of 650–675° C. until all volatile material has been stripped from the catalyst. Valve 29 is then closed, and valves 35 and 36 in air inlet and exit lines 37 and 38 respectively are opened. Air is then blown through the reactor 15 until all the carbonaceous deposits are burned off, steam being also admitted in such quantity as to hold the maximum temperature to a value of from about 1000° to about 1050° F. If necessary, a combustible gas may be admitted to the reactor 15 through line 39, in order to initiate combustion. The steam and combustion gases are vented from reactor 15 through line 38 to a stack (not shown) or may be passed to heat exchangers to furnish part of the process heat.

After all the carbonaceous material has been burned off the catalyst, valves 13', 17', 33, 35, and 36 are closed, and valves 13 and 17 are opened to permit the feed oil to pass through the regenerated catalyst in reactor 15. The deactivated catalyst in reactor 15' is then regenerated in the manner described above, and the cycle is repeated at intervals in order to provide a continuous treating process.

It will be appreciated that, while for purposes of illustration only two reactors have been shown, one of which is on stream while the other is undergoing regeneration, three or more reactors may be used, only one of which is on the regeneration cycle, depending on the length of the on stream cycle and the length of the regeneration cycle. Thus if the reactor can be operated on stream for 24 hours, and the length of the regeneration cycle is 6 hours, there would be a battery of five reactors, four of which would at all times be on stream while the fifth was being regenerated.

It will also be appreciated that while the treatment of a light furnace oil has been described above, my process is not limited to the treatment of such oils, but is equally applicable to the treatment of lighter or heavier oils, provided only that they are contaminated with gum-forming impurities which render them unstable on storage.

My preferred catalyst is aluminum fluoride supported on silica gel, but it will be apparent that there are other supporting materials which are equally suitable for my purposes. The fluoride may be deposited on the support in any manner known to the art, but I have found that excellent results may be obtained with a catalyst prepared in the following manner. A solution of about 7 percent $AlF_3 \cdot 3HF$ in water is prepared by suspending $Al(OH)_3$ in water, and adding sufficient HF in 40% solution to form the soluble complex $AlF_3 \cdot 3HF$, followed by dilution to 7 percent strength. Silica gel is then added until the solution just covers the gel. The mixture is allowed to stand for about one half hour, excess solution is drained from the gel, and the gel is dried. After drying, it is calcined at 1000 F. or thereabouts for a period of from about two to about four hours to yield a catalyst containing about 4% $AlF_3$. The strength of the treating solution is, however, not critical and can be varied over wide limits, satisfactory results having been obtained with solutions of from 4% to 20% strength. Deposition of more $AlF_3$ on the support, by use of a more concentrated $AlF_3 \cdot 3HF$ solution, does not, however, improve the catalyst to any marked degree, and merely adds to the cost of the catalyst.

Referring now more particularly to Figs. 2 and 3, Fig. 2 shows the amount of impurities removed as polymers from a light cycle oil (oil A), when treated at various temperatures and for various periods of time in contact with my preferred catalyst. This particular cycle oil distilled as follows:

| | °F. |
|---|---|
| I. B. P | 445 |
| 10% | 485 |
| 50% | 521 |
| 90% | 601 |
| E. P | 666 |

It will be noted that the maximum polymer formation during treatment, at all treating times, showed a very definite peak at temperatures between 625° F. and 650° F., near the end boiling point of the oil. Since the amount of polymers formed during treatment is an index of the amount of gum-forming impurities removed from the oil, it will be apparent that the treating temperature is a critical factor in my invention.

Fig. 3 shows the amount of impurities removed as polymers from a cycle oil from a different source (oil B), when treated for ten and 15 minutes at various temperatures. This particular oil had a distillation curve as follows:

| | °F. |
|---|---|
| I. B. P | 458 |
| 10% | 480 |
| 50% | 502 |
| 90% | 538 |
| E. P | 564 |

It will be noted that the optimum treating temperature of this oil was 575° F., a temperature quite close to its end boiling point, showing again that the optimum treating temperature varies directly with the end boiling point of the oil being treated. This same effect was observed in treating two other oils, one, boiling between 289° F. and 441° F. having an optimum treating temperature of 440° F.; the other, boiling between 443° F. and 535° F. having an optimum treating temperature of 550° F.

Stability of the treated oil in storage was tested by placing samples of the oil in vented bottles and storing the bottles at a temperature of 110° F. for a number of weeks, samples being withdrawn each week for testing of gum content. It has been found by experience that one week's storage under these conditions is equal to one month's drum storage under atmospheric temperature conditions insofar as gum formation is concerned, so that 12 weeks' storage at 110° F. is equivalent to one year's storage in drums or tankage. Results of storage tests for oil A treated for 2, 3, and four minutes at about 650° F. is given in the following table, gum content being expressed as milligrams of gum per 100 milliliters of oil.

Table

| | Storage Time—Weeks | | | | | | Inc. in Gum Content | |
|---|---|---|---|---|---|---|---|---|
| | 0 | | 6 | | 12 | | Sol. | Insol. |
| | Sol. | Insol. | Sol. | Insol. | Sol. | Insol. | | |
| Untreated | 1.8 | 0.5 | 22.8 | 1.2 | 38.6 | 6.0 | 36.8 | 5.5 |
| 2 min. treat | 4.8 | 0.6 | 5.4 | 2.1 | 6.4 | 2.1 | 1.6 | 1.5 |
| 3 min. treat | 4.8 | 1.3 | 6.6 | 2.3 | 6.0 | 2.0 | 1.2 | 0.7 |
| 4 min. treat | 2.6 | 1.0 | 5.0 | 1.7 | 7.2 | 2.5 | 4.6 | 1.5 |

Insoluble gum was determined by filtering and weighing the insoluble precipitate, and soluble gum was determined by Steam Jet Method U. O. P. J-263-49A, which is similar to A. S. T. M. Method D381-46 for "Existent Gum in Gasoline, Air-Jet Evaporation Method," except that steam instead of air is used for evaporation, and steam temperatures up to 600° F. are used.

It will be observed that the treated oils, while initially slightly higher in gum content than the untreated oil, show only slight increases in gum content after a storage period equivalent to one year's drum storage. Similar storage results were obtained on oil B treated for two, three, and four minutes, and on other oils tested. Oils treated for five to twenty minutes showed slight increases in stability over the oils treated for lesser times, but, as may be observed from the table, even at two minutes' treating time, the oil produced is so stable that longer treating times are unnecessary, except when water-white oils are desired.

Having now described my invention, what is claimed is:

1. The method of stabilizing catalytically cracked oils which comprises contacting an unstable catalytically cracked oil in the No. 2 fuel oil boiling range with a catalyst comprising aluminum fluoride, at a temperature within about 50° F. of the end boiling point of the oil to be treated.

2. The method of stabilizing catalytically cracked petroleum fractions which comprises contacting an unstable catalytically cracked petroleum fraction in the No. 2 fuel oil boiling range in liquid phase with a catalyst comprising aluminum fluoride, at a temperature within about 50° F. of the end boiling point of the petroleum fraction to be treated.

3. The method of stabilizing catalytically cracked petroleum fractions which comprises contacting an unstable catalytically cracked petroleum fraction in the No. 2 fuel oil boiling range under super atmospheric pressures sufficient to maintain the petroleum fraction in liquid phase, with a catalyst comprising aluminum fluoride, at a temperature within about 50° F. of the end boiling point of the petroleum fraction to be treated, for a period of from about two to about twenty minutes.

4. The method of stabilizing catalytically cracked petroleum fractions which comprises contacting an unstable catalytically cracked petroleum fraction in liquid phase and at a temperature within about 50° F. of the end boiling point of the petroleum fraction, with a catalyst prepared by contacting silica gel with an aqueous solution of $AlF_3.3HF$, draining excess solution from the gel, and thereafter calcining the gel at a temperature of about 1000° F.

5. The method according to claim 4 in which the aqueous solution of $AlF_3.3HF$ contains from about 4 percent to about 20 percent $AlF_3.3HF$ by weight.

6. The method according to claim 4 in which the aqueous solution contains about 7 percent $AlF_3.3HF$ by weight.

7. The method of removing gum-forming impurities from mineral oils which comprises contacting a mineral oil in the No. 2 fuel oil boiling range which contains gum-forming impurities of a character such that the oil is unstable in storage with a catalyst comprising aluminum fluoride, at a temperature within about 50° F. of the end boiling point of the oil, separating the oil from the catalyst, and subjecting the oil to fractional distillation to recover as an overhead product a mineral oil having a substantially reduced content of gum-forming impurities.

8. The method of removing gum-forming impurities from mineral oils which comprises contacting a mineral oil in the No. 2 fuel oil boiling range which contains gum-forming impurities of such a character as to render the oil unstable in storage with a catalyst comprising aluminum fluoride, at a temperature within about 50° F. of the end boiling point of the oil and at a superatmospheric pressure sufficiently high to maintain the oil in liquid phase, separating the oil from the catalyst, and subjecting the oil to fractional distillation to recover as an overhead product a mineral oil having a substantially reduced content of gum-forming impurities.

9. The method of removing gum-forming impurities from mineral oils which comprises contacting a mineral oil in the No. 2 fuel oil boiling range which contains gum-forming impurities of such a character as to render the oil unstable in storage with a catalyst comprising aluminum fluoride, at a temperature within about 50° F. of the end boiling point of the oil and at a superatmospheric pressure sufficiently high to maintain the oil in liquid phase, for a period of from about two to about twenty minutes, separating the oil from the catalyst, and subjecting the oil to fractional distillation to recover as an overhead product a mineral oil having a substantially reduced content of gum-forming impurities.

10. The method of removing gum-forming impurities from mineral oils which comprises contacting a mineral oil which contains gum-forming impurities of such a character as to render the oil unstable in storage, in liquid phase and at a temperature within about 50° F. of the end boiling point of the oil, with a catalyst prepared by contacting silica gel with an aqueous solution of $AlF_3.3HF$, draining excess solution from the gel, and thereafter calcining the gel at a temperature of about 1000° F., separating the oil from the catalyst, and subjecting the oil to fractional distillation to recover as an overhead product a mineral oil having a substantially reduced content of gum-forming impurities.

11. The method according to claim 10 in which the aqueous solution of $AlF_3.3HF$ contains from about 4 percent to about 20 percent $AlF_3.3HF$ by weight.

12. The method according to claim 10 in which the aqueous solution contains about 7 percent $AlF_3.3HF$ by weight.

DANIEL MILSOM.

References Cited in the file of this patent

UNITED STATES PATENTS

| Number | Name | Date |
| --- | --- | --- |
| 372,672 | Hall | Nov. 8, 1887 |
| 2,195,747 | Keunecke et al. | Apr. 20, 1940 |
| 2,286,129 | Veltman | June 2, 1942 |